United States Patent Office 2,970,058
Patented Jan. 31, 1961

2,970,058

PROCESS FOR PREPARING A FRUIT JUICE IN POWDER FORM

Luciano Nobile, Milan, Italy, assignor to Ledoga S.p.A., Milan, Italy, a company of Italy No Drawing. Filed Feb. 18, 1960, Ser. No. 9,429

Claims priority, application Italy Dec. 4, 1959

8 Claims. (Cl. 99—206)

This invention relates to a process for preparing fruit or vegetable juices in powder form having an improved storage stability, and better flavor and taste as compared with the powdered juices prepared in accordance with the process of the prior and contemporary art.

The difficulties attendant to the preparation of fruit and vegetable juices in powder form which are satisfactory from both the point of view of taste and flavor and the storage stability are well known in the art. Powdered fruit and vegetable juices to be used in solutions for preparing, for example, instant fruit beverages, vegetable cocktails, instant soups, for flavoring various food products and the like, are nearly always admixed with inert filler substances such as pectoalbumins, gelatins, lactose and the like: these inert additives frequently impair the solubility of the powdered fruit and vegetable juices admixed therewith and are also such as to unfavourably affect the flavor and the taste of the natural product.

On the other hand, the use of an inert support of filler is nearly imperative, due to the fact that the majority of the fruit and vegetable juices contain reducing sugars which are such as to impart a pasty or semi-fluid consistency to the fruit or vegetable concentrates.

All the attempts heretofore made in order to overcome the shortcomings briefly described above have proven, almost in every case, unsuccessful: the employment of very reduced pressures or other special technical expedients have added very little to a satisfactory solution of the problem of obtaining powdered fruit juices in the form of a really dry, free-flowing powder. Another requirement which is of an imperative nature is that the filler or supporting substances incapable of being attacked by the acidic surroundings which are almost invariably present in fruit juices.

It has been previously proposed to employ sucrose, or common cane or beet sugar, as the inert or filling additive, also by reason of its low cost and ready availability on the market: sucrose, however, is not immune from objections in that the acidity of the fruit juices very often causes its inversion. It has been experienced in fact, that, by admixing sucrose even in very large amounts (1 part of fruit juice for 10 parts sucrose, by weight) to fruit juices, the mixture was reduced, with the lapse of time, into a mass having the consistency and the gelatinous aspect of invert sugars.

These naturally occurring inversion phenomena are moreover encouraged not only by the high acidity of the fruit or vegetable concentrates, but also by the presence of hygroscopic salts which, by absorbing moisture from the atmosphere, cause the agglomeration and then the liquation of the fruit juice powders.

It is thus an object of the present invention to provide a process for preparing fruit juice powders having an outstanding storage stability which are also such as to retain their organoleptic properties, such as flavor, taste and aroma, substantially unaltered with the course of time.

Another object of the present invention is to provide a nonexpensive, tasty and nontoxic additive for fruit juices prepared in powder form.

It has been surprisingly found, according to the invention that xylitol, a pentite obtainable, for example by reduction of xylose, is an edible nontoxic unexpensive substance which also exhibits the outstanding property of strongly and longlastingly retaining the taste and flavor of the powdered fruit juices admixed therewith.

Furthermore, xylitol permits the preparation of extremely storage-stable powders since the phenomenon of inversion of sugars has never been reported.

Broadly stated, the improved process according to my invention comprises the steps of preparing a fruit or vegetable in juice or pulp form and admixing therewith an amount of xylitol sufficient to obtain a free-flowing powder.

The amount of xylitol is never critical of itself, especially in view of the fact that it is an edible, harmless and nontoxic substance.

The process according to the invention can be performed in several ways, that is, the xylitol may be admixed to the pressed juices and the mixture thus obtained concentrated in vacuo, or, for example, xylitol may be added to the vegetable or fruit concentrate (which can also be almost totally dried) subsequently.

The only provision which is recommendable for a long storage life of the powdered fruit juices obtained with the process of the present invention is that of introducing the finished product in fluid-tight sealed cans, a practice which, however, is now so conventional in the art that it hardly needs to be recalled here: this provision is necessary to overcome the harmful effects of the hygroscopic salts possibly present.

The process of the invention will now be exemplified by a few operative examples which are by no means intended as limitations of the process.

Example 1

One kilogram of pineapple juice is admixed with 100 grams of xylitol. The mixture is concentrated under vacuum, at an absolute pressure adapted to preserve the taste and flavour of the fruit while removing the undesired water contents: the pressure is not critical in any way and can be selected according to the individual requirements and plant facilities. Once the desired degree of dryness is achieved, the mixture is powdered and packed in fluid-tight containers; if desired, certified flavoring and coloring substances may be added prior to sealing.

Example 2

One kilogram of apricot juice is admixed with 30 grams of xylitol. Xylitol is caused to be dissolved in the juice and the solution is concentrated in vacuo until dry. The dried mixture is added to 50 grams of xylitol, powdered and packed in sealed containers. The process according to the invention is applicable also to nonacidic juices of fruits and vegetables, as will be apparent from the following Examples 3 and 4.

Example 3

Two kilograms of banana mash having 75% by weight of water are admixed with one kilogram of xylitol and evaporated in vacuo until the final mass contains not more than 10% water, by weight. A flour-like product of agreeable taste and flavour is obtained which, in addition, does not give rise to lump formation contrary to what occurs with the conventional banana-flour. The product is more easily water-dispersible in water than the ordinary banana flour.

The procedure of this example is equally successfully applicable to other fruits, such as anona, khaki, carobs, dates.

Example 4

500 grams of xylitol are added to 2 kgs. of homogenized carrot mash, the mixture is dried in vacuo until the final mass contains not more than 10% of water, by weight. A perfectly dispersible product is obtained, which has a concentration twice the original mash.

The procedure of this example can be applied also to other vegetables, such as cucumbers, gherkins, lettuce, spinch, cabbage, celery, tomato, Savoy cabbage and others.

It is believed that the foregoing examples are sufficient to give a clear indication of how the process according to the invention can be put into practice by those skilled in the art who may introduce all the modifications and adaptations that are within their purview, without departing from the scope of the present invention as encompassed and defined in the appended claims.

What I claim is:

1. A process for preparing a fruit juice in powder form, comprising the steps of preparing a fruit in juice or pulp form admixing therewith a substantial amount of xylitol, evaporating the mixture so as to remove a substantial amount of water therefrom, and introducing the dried mixture into fluid-tight containers.

2. A process for preparing a fruit juice in powder form, comprising the steps of preparing a fruit in juice or pulp form, admixing therewith an amount of xylitol sufficient to obtain a free-flowing powder, evaporating the mixture so as to remove at least 90% by weight of water therefrom, and introducing the dried mixture into fluid-tight containers.

3. A process for preparing a fruit juice in powder form, comprising the steps of preparing a fruit in juice or pulp form, evaporating the juice until removing a substantial amount of water therefrom, admixing to the evaporated juice a substantial amount of xylitol, and introducing the thusly obtained mixture into fluid-tight containers.

4. A process for preparing a fruit juice in powder form, comprising the steps of preparing a fruit in juice or pulp form, evaporating the juice until removing at least 90% of water by weight therefrom, admixing to the evaporated juice an amount of xylitol sufficient to obtain a free-flowing powder, and introducing the thusly obtained mixture into fluid-tight containers.

5. A process for preparing a vegetable juice in powder form, comprising the steps of preparing a vegetable in juice or pulp form, admixing therewith a substantial amount of xylitol, evaporating the mixture so as to remove a substantial amount of water therefrom, and introducing the dried mixture into fluid-tight containers.

6. A process for preparing a vegetable juice in powder form, comprising the steps of preparing a vegetable in juice or pulp form, admixing therewith an amount of xylitol sufficient to obtain a free-flowing powder, evaporating the mixture so as to remove at least 90% by weight of water therefrom, and introducing the dried mixture into fluid-tight containers.

7. A process for preparing a vegetable juice in powder form, comprising the steps of preparing a vegetable in juice or pulp form, evaporating the juice until removing a substantial amount of water therefrom, admixing to the evaporated juice a substantial amount of xylitol, and introducing the thusly obtained mixture into fluid-tight containers.

8. A process for preparing a vegetable juice in powder form, comprising the steps of preparing a vegetable in juice or pulp form, evaporating the juice until removing at least 90% by weight of water therefrom, admixing to the evaporated juice an amount of xylitol sufficient to obtain a free-flowing powder, and introducing the thusly obtained mixture into fluid-tight containers.

References Cited in the file of this patent

UNITED STATES PATENTS 2,453,142    Lee    Nov. 9, 1948

OTHER REFERENCES

Industrial and Engineering Chemistry, April 1943, vol. 35, No. 4, pages 470 to 474.